Figure 6:
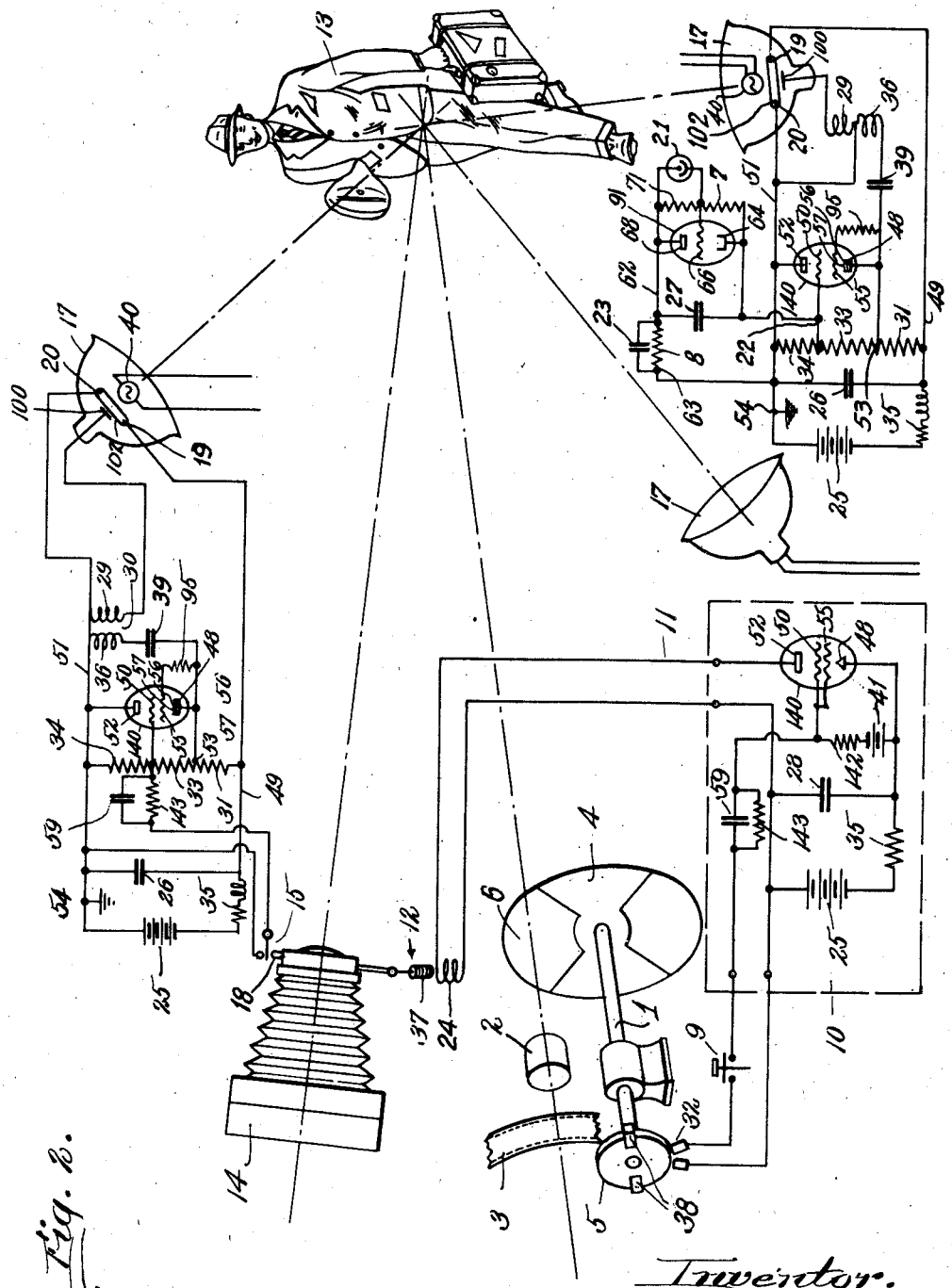

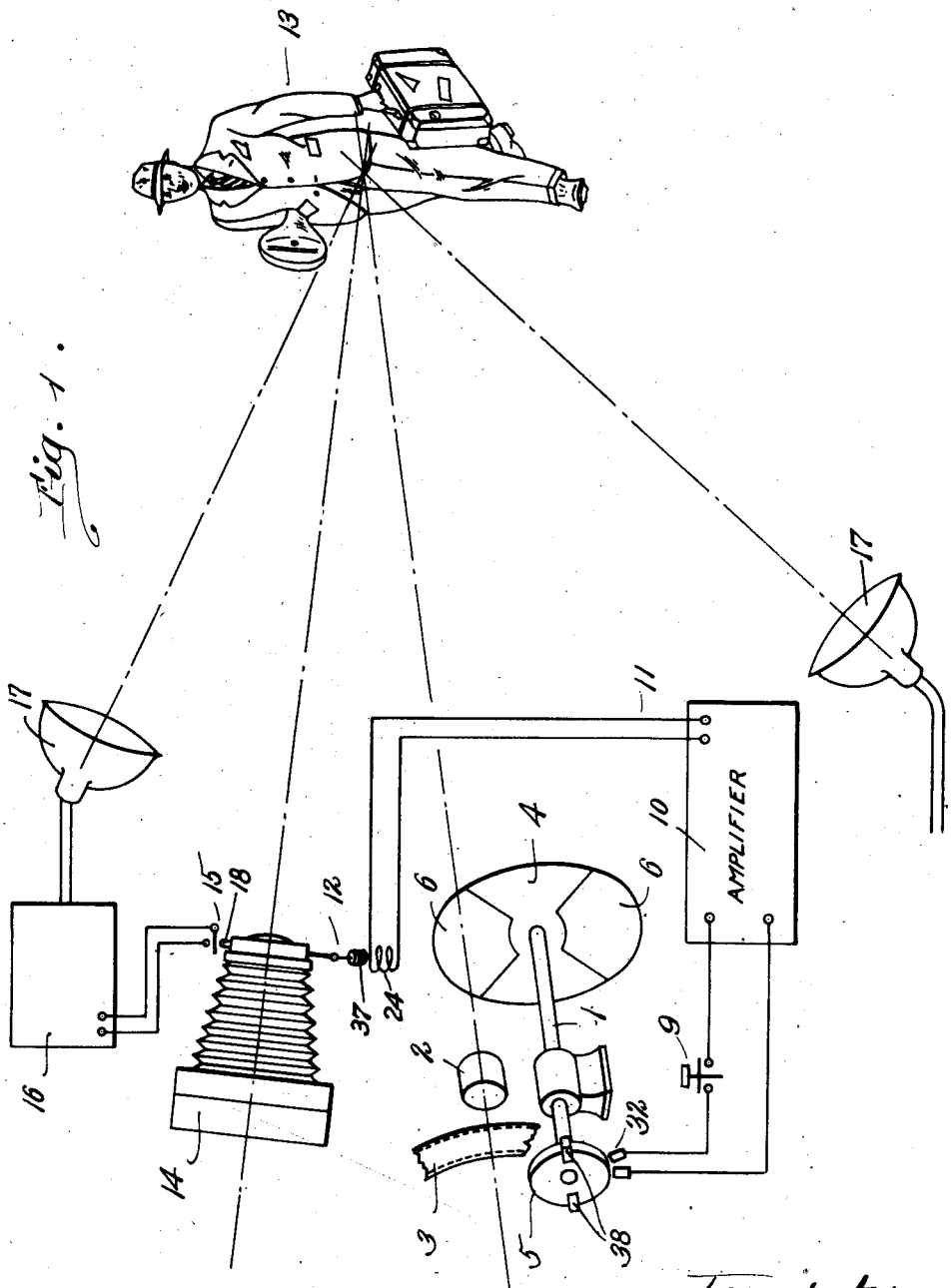

Inventor.
HAROLD E. EDGERTON

Patented Jan. 22, 1946

2,393,316

UNITED STATES PATENT OFFICE 2,393,316

FLASH-PHOTOGRAPHY METHOD AND APPARATUS FOR USE WITH MOTION-PICTURE CAMERAS

Harold Eugene Edgerton, Belmont, Mass.

Application October 1, 1940, Serial No. 359,212

25 Claims. (Cl. 88—16)

The present invention relates to electric methods, systems and apparatus. Though the invention has application also to other fields, it relates more particularly to methods, systems and apparatus designed for flash photography, especially in motion-picture studios.

During the production of a motion-picture play, numerous still pictures are taken for use later in publicity and promotional work. In order that these still pictures may be of suitable quality for reproduction, it is necessary to employ a large camera. It is consequently requisite, in order to obtain the same depth, that its aperture be smaller than that of the motion-picture camera. Under the same light conditions, it follows that the exposure time for the still camera must be much longer than that for the motion-picture camera. An exposure time of a second or more is often used in studios at the present time. During that second or more, until the still picture has become fully exposed, the actors must continue to hold their poses. Though the still pictures thus obtained may be without blur due to motion or action, they frequently have the appearance of posed shots.

An object of the present invention is to provide a novel method and a novel system and apparatus for taking short-exposure still pictures of the above-described character. The aperture of the still camera may be small enough to produce a photograph having adequate depth even with a large-size camera. The resulting scenes thus obtained portray the meaning without pose and, furthermore, valuable time is saved, as it is not necessary to discontinue the filming of the play during the taking of the still photograph.

Other and further objects will be described hereinafter and will be particularly pointed out in the appended claims.

The invention will now be described more fully in connection with the accompanying drawings in which Fig. 1 is a diagrammatic perspective of apparatus and circuits that may be used in carrying out the present invention; and Fig. 2 is a similar view containing also a circuit diagram that may be employed in practicing the invention, with parts omitted, for clearness.

A revolving, segmented shutter 4 of a motion-picture camera is directly connected by a shaft 1 to a segmental contactor 38 on a disc 5 mounted on the shaft. The shutter 4 is mechanically connected in the usual way, so as to operate in synchronism with the film 3, the latter being advanced while the shutter is closed. The contactor 38 engages contact-member brushes 32 during that part of the cycle of revolution of the shutter 4 when this shutter covers the lens 2 of the motion-picture camera. The contactor 38 and the brushes 32 constitute a synchronising switch that is closed during part of the time that the shutter 4 is closed. A still-camera synchronizer, as will presently be explained, is connected in series with the brushes 32.

Light from an object 13 to be photographed travels through the openings 6 in the shutter 4 and through the lens 2 to the motion-picture film 3. The brushes 32 are connected in series with a normally open manually controlled push-button switch 9 and a condenser 59 to a normally ineffective amplifier 10 that is shown connected by conductors 11 to the still camera 14.

Although the hereinafter-described operation may be initiated without the amplifier 10, the amplifier is desired because the duration of the contact between the contactor 38 and the brushes 32 is very short. The amplifier should preferably be of the trigger type, for giving an output surge of constant energy regardless of the duration of the input signal. One type of satisfactory amplifier 10 is illustrated in Fig. 2, comprising a gas-filled grid-controlled tube 140. The trigger tube 140 may be a thyratron, as described in United States Letters Patent 2,181,879, issued December 5, 1939, or it may be of the type that is disclosed, for example, in Letters Patent 2,185,189, issued January 2, 1940, to Kenneth J. Germeshausen. It may comprise an evacuated glass envelope filled with a suitable gas, such as neon, and is shown provided with a plurality of electrodes, namely, a solid cathode 48, an anode or plate 52, and one or more grids, inner and outer grids being shown at 55 and 50, between the cathode 48 and the anode 52. In the circuit of the amplifier 10, as illustrated in Fig. 2, the grids 50 and 55 are shown connected together, to operate as a single grid. In two other circuits illustrated in Fig. 2, however, the grids 50 and 55, as will be explained more fully hereafter, operate as separate grids.

It is characteristic of such a tube that it is normally non-conducting. The grid 50 controls the starting of the arc discharge, but it has no effect upon the performance after the start.

As described in the said Letters Patent 2,185,189, the cathode 48 may comprise a metal cup containing a pill 56 constituted of a mixture of materials that can react chemically to produce a substance of relatively low work-function, such as caesium chloride and aluminum filings. The pill 56 is held in place by a wire-mesh screen 57. The source of the electrons is a bright cathode spot on the surface of the pill 56.

The still camera 14 is provided with a normally closed shutter 18, under the control of an electromagnetic trip 12, comprising an armature 37 connected to the shutter 18 and an energizing coil 24 therefor. The coil 24 is connected by the conductors 11 in the output circuit of the tube 140, so as to receive an impulse when a condenser 28 discharges through this tube 140. The condenser 28 normally stores energy from a battery or other source of energy 25, to which it is connected through a charging impedance 36.

Normally unenergized electric-flash-lamp reflector units 17 are shown widely spaced in various parts of a room, at a substantial distance from one another, in order that they may be focussed upon the object 13 to be photographed with the aid of the camera 14. Each reflector unit 17 is provided with a flash-tube or flash-lamp 102 for providing an intense flash of light. A switch 15 on the shutter 18 of the camera 14 is connected through a power unit 16 to the flash tube 102 of one of the flash-lamp units 17. The switch 15, as will hereinafter appear, is under the control of the push-button switch 9 and the contactor 38. As explained in a copending application, Serial No. 340,580, filed June 14, 1940, by Harold E. Edgerton, the flash-lamp may be in the form of a straight tube or of the coiled-tube type. It may contain krypton, argon, neon or any other suitable gas or mixture of gases.

It will be understood that as many reflector-lamp units 17 as desired may be employed, as described in the said application, Serial No. 340,580. The power unit 16 may be of the same nature as is described in the said application, with the switch 15 connected between the control grid 50 and the anode 52 of a tube 140 that is connected to one of the flash-lamp units 17. The other flash-lamp units 17 may be termed photo-cell units, because they may be caused to flash synchronously, in response to the flashing of the said one flash-lamp unit 17, through the medium of respective photo-electric cells 21, as also described in the said application.

The reflector units 17 may each be provided also with a focussing lamp 40, for providing continuous light to facilitate lining up the reflector and focussing the camera 14 prior to operating the flash-lamp for producing the exposure. The lamp 40 may, for example, be one of the types of light sources that are usually employed for illuminating the motion-picture scene.

The switch 15, when closed, will flash the lamp unit 17 to which it is connected at an instant when the shutter 4 of the motion-picture camera is closed, and the shutter 18 of the still camera 14 is open; and the other flash-lamp units 17 will flash in synchronism therewith, as described in the said application, Serial No. 340,580. If there should intervene some slight delay of the electromagnetic-shutter trip 12, the contact brushes 32 or the contactor segment 38 may be adjusted to compensate therefor.

In the circuit of the amplifier 10, an impedance 142 is shown connected in the grid circuit, between the cathode 48 and the grid 50, in series with a biasing battery 41. The grid bias 41 is adjusted to a suitable value for the particular type of tube used. The bias may, however, be obtained by the use of the conventional potential divider or resistor at an appropriate place in the circuit, as illustrated in the power unit 16. The type of trigger circuit is more fully described in the said Letters Patent 2,181,879.

When it is desired to take a still photograph, the operator will manipulate the push-button switch 9. At the next-following instant, the contactor 38 bridges the brushes 32 as the shutter momentarily closes. This produces a charge upon the condenser 59, resulting in a surge of voltage becoming impressed upon the grid 50. This raises the potential of the grid 50 until the break-down voltage between the grid 50 and the cathode 48 is exceeded, whereupon the trigger tube 140 becomes conducting. This surge of voltage is produced from the battery 25 by means of a circuit extending from the positive terminal of the battery, through the brushes 32 and the contactor 38, and the condenser 59, to the connected-together grids 50 and 55; thence, through the tube 140, to the cathode 48; and from the cathode 48, through the charging impedance 36, to the negative end of the battery 25. The condenser 59 becomes thus charged from the battery 25. The grid potential becomes positive during the time the condenser 59 is charged.

The condenser 28 then discharges through the condenser-discharge circuit comprising the tube 140 and the coil 24. The tube 140 of the amplifier 10, therefore, sends an actuating impulse, by way of the conductors 11, to the coil 24. The resulting surge of current through the coil 24 will produce operation of the normally closed shutter 18 of the still camera 14 at the moment of energization of the grid 50. This will result in flashing the lamp unit 17 connected to the power unit 16 and such additional lamp units 17 as may be connected to flash therewith. The still picture is thus taken at a time when the flashes from the lamp units 17 will not expose the motion-picture film 3.

A resistor 143 is connected across the condenser 59, in order to leak off the charge between operations. The value of the resistance of the resistor 143 is so selected that the condenser 28 shall be discharged in time for the next operation, but so as not to flash the tube more than once.

It will be observed that the bridging of the brushes 32 by the contactor 38 can not, of itself, effect the flashing of the flash-lamp, or the exposure of the object illuminated thereby in the still camera 14; and that the manual closing of the push-button switch alone is equally ineffective to produce this result. The mere closing of the push-button switch 9 alone can not produce the above-described surge of voltage upon the grid 50 that initiates the discharge of the condenser 28 through the tube 140 of the amplifier 10. If pressing down manually the push-button 9 were of itself sufficient to produce a flash of the unit 17 and consequent illumination of the object 13, an exposure might occur in the still camera 14 at a time when the shutter 4 of the motion-picture camera is open. This would be undesirable. The applicant's invention insures that the condenser 59 shall receive its charge to energize the grid 50 of the amplifier 10 at times only during the operation of the motion-picture camera when the motion-picture camera shutter 4 is closed. The normally closed shutter 18 of the still camera 14, therefore, can open to expose the object 13, and the flash-lamp unit 17 of the power unit 16 can illuminate this object 13, at times only during the operation of the motion-picture camera when the shutter 4 thereof is closed.

It is now in order more fully to describe the circuits for energizing the flash-lamps 102 of the reflector units 17. Each flash-lamp 102 is provided with two terminals, constituted of a cathode 19 and an anode 20 connected, by conductors 49 and 51, to a condenser 26, and a trigger starting or control electrode 100. The condensers 26, like the condenser 28, are shown supplied with energy from a battery 25, through a charging impedance 35.

Each condenser 26 is also connected by the conductors 49 and 51, in parallel with the tube 102, to a bleeder resistor 33, 34, in series with a bleeder resistor 31. In the circuit of the amplifier 10, as before explained, the grids 50 and 55 are connected together. Here, however, the resistor 33 is shown connected between the cathode 48 and the grid 50, and an impedance 95 is connected between the cathode 48 and the grid 55. Referring, first, to the power circuit 16, the circuit associated with, for energizing, the tube 102 is normally ineffective, as the tube 102 is normally non-conducting, but the condenser 26 will discharge through the tube 102 when the normally ineffective amplifier 10 becomes effective to close the switch 15.

The trigger tube 140 of the power circuit 16 may be connected to a terminal 53 and a grounded terminal 54, at the ends of the bleeder resistor 33, 34, so as to be supplied with voltage therefrom. The resistors 31, 33 and 34 are so proportioned that a desired voltage of, say, 300 volts shall appear across the terminals 53 and 54. To the terminals 53 and 54 there are also connected, in series with a condenser 39, a primary winding 36 of a transformer 30, which may be constituted of a well-known spark coil. The secondary winding 29 of the transformer 30 is connected to the anode 20 and the trigger control electrode 100. The switch 15 operates upon the condenser 59 of the power circuit 16 in a manner similar to the operation of the contactor 38 and the brushes 32 upon the condenser 59 of the amplifier 10.

In operation, referring to the power circuit 16, the condenser 26 starts to become charged from the direct-current source 25, the tube 140, as before explained, being non-conductive. At any time after the voltage across the condenser 59 reaches its maximum value, the primary winding 36 of the transformer 30 will become energized in the same way as the coil 24 before described. The resulting high-voltage surge of the secondary winding 29 of the transformer 30 is applied to the trigger electrode 100 of the flash tube 102. This causes the gas in the flash tube to ionize, permitting the condenser 26 to discharge through the flash-lamp between its electrodes, producing a very brilliant flash of short duration. When the condenser 26 is fully discharged, the tube promptly extinguishes and the cycle is ready for repetition.

The connections of the photo-cell units are similar, except that the circuits are tripped by energization of the photo-cells 21 instead of by the switch 15. The flash-lamp 102 of the reflector 17 of the power circuit 16 may be tripped by the switch 15 in response to operation of the switch 9, and the flash-lamps 102 of the other units 17 will be tripped by the action of the photo-electric cells 21 of those other units 17 in response to the flash of the said one unit, as described in the said application, Serial No. 340,580.

The photocell trip circuit may be traced in the lower right-hand circuit-diagram part of Fig. 2 from the terminal 22 connected to the grid 50, through an amplifier tube 91 and the series-connected resistors 7 and 71, in parallel, by way of a conductor 62, through a blocking condenser 23 and a leak resistor 8, in parallel, to a grounded terminal 63, that is connected to the anode 52. The resistor 7 is connected between the cathode 64 and the control electrode or grid 66, and the resistor 71 and the photo-electric cell, in parallel, between the control electrode 66 and the anode 68 of the amplifier 91. A condenser 27 is connected between the cathode 64 and the anode 68. The amplifier 91 is normally ineffective, but the photo-electric cell 21 is able to trip this circuit by reason of its connection between the grid 66 and the anode 68 of the amplifier 91, in parallel with the resistor 71. When the amplifier 91 becomes thus effective, the condenser 27 is enabled to discharge therethrough, thus rendering effective the normally ineffective circuit of the tube 140, to permit the condenser 26 to discharge through the tube 102.

The control by means of the photo-electric cell 21 is effected at the moment that a flash of light produced by the unit 17 of the power circuit 16, in response to the operation of the push-button switch 9, strikes the cell 21. This effects a change of potential on the grid 66 of the relay amplifier tube 91. The tube 91, which is normally non-conducting, becomes thereupon conducting, causing a sudden surge to become impressed upon the grid 50 of the tube 140.

The time taken for the circuit to function from the closing of the switch 15 or the operation of the photo-electric cell 21 to the flash of light from the tube 102 is very brief. The flash duration is a function of the circuit elements and electrical conditions.

This method can be used with any other type of flash lamp as, for instance, the aluminum-oxygen flash bulbs. The flash duration of the bulb must be less than the time the shutter is closed.

Modifications will occur to persons skilled in the art and all such are considered to fall within the spirit and scope of the invention, as defined in the appended claims.

What is claimed is:

1. Apparatus of the character described having, in combination with a motion-picture camera having a motion-picture-camera shutter for taking motion-pictures of an object at times during the operation of the camera when the shutter is open, a still camera having a normally closed still-camera shutter, manually controlled means for opening the still-camera shutter, and means whereby the manually controlled means is effective to open the still-camera shutter at times only during the operation of the motion-picture camera when the motion-picture-camera shutter is closed.

2. Apparatus of the character described having, in combination with a motion-picture camera having a motion-picture-camera shutter for taking motion-pictures of an object at times during the operation of the camera when the shutter is open, a still camera having a normally closed still-camera shutter, manually controlled means for illuminating the object and opening the still-camera shutter, and mean whereby the manually-controlled means is effective to illuminate the object and open the still-camera shutter at times only during the operation of the motion-picture camera when the motion-picture-camera shutter is closed.

3. Apparatus of the character described having, in combination with a motion-picture camera having a motion-picture-camera shutter for taking motion-pictures of an object at times during the operation of the camera when the shutter is open, a still camera having a normally closed still-camera shutter, a flash-lamp, an electric circuit to which the flash-lamp is connected, means for controlling the circuit to energize the flash-lamp in order to illuminate the object and for opening the still-camera shutter while the object is illuminated, and means whereby the first-named means is effective to control the circuit to illuminate the object and open the still-camera shutter at times only during the operation of the motion-picture camera when the motion-picture-camera shutter is closed.

4. Apparatus of the character described having, in combination with a motion-picture camera having a shutter for taking motion-pictures of an object at times during the operation of the camera when the shutter is open, a flash-lamp, an electric circuit to which the flash-lamp is connected, manually controlled means for controlling the circuit to energize the flash-lamp in order to illuminate the object, and means whereby the manually controlled means is effective to control the circuit at times only during the operation of the camera when the shutter is closed.

5. Apparatus of the character described having, in combination with a motion-picture camera having a motion-picture-camera shutter for taking motion-pictures of an object at times during the operation of the camera when the shutter is open, a still camera having a normally closed still-camera shutter, a flash-lamp, an electric circuit to which the flash-lamp is connected, manually controlled means for controlling the circuit to energize the flash-lamp in order to illuminate the object and for opening the still-camera shutter while the object is illuminated, and means whereby the manually controlled means is effective to control the circuit to illuminate the object and open the still-camera shutter at times only during the operation of the motion-picture camera when the motion-picture-camera shutter is closed.

6. Apparatus of the character described having, in combination with a motion-picture camera having a shutter for taking motion-pictures of an object at times during the operation of the camera when the shutter is open, a plurality of flash-lamps, means for flashing one of the flash-lamps to illuminate the object, means whereby the flashing means is effective to flash the said one lamp at a time only during the operation of the camera when the shutter is closed, means responsive to the flash produced by the said one flash-lamp for flashing another flash-lamp during the time of flash of the said one flash-lamp, and means operable in response to the operation of the camera when the shutter is closed and when the flash-lamps are flashing for taking a still picture of the object.

7. Apparatus of the character described having, in combination with a motion-picture camera having an aperture and a motion-picture-camera shutter normally closing the aperture for taking motion-pictures of an object at times during the operation of the camera when the shutter is open, a still camera having an aperture smaller than the aperture of the motion-picture camera and a still-camera shutter normally closing the aperture of the still camera, a flash-lamp, an electric circuit to which the flash-lamp is connected, means for controlling the circuit to energize the flash-lamp in order to illuminate the object and for opening the still-camera shutter while the object is illuminated, and means whereby the first-named means is effective to control the circuit to illuminate the object and open the still-camera shutter at times only during the operation of the motion-picture camera when the motion-picture-camera shutter is closed.

8. Apparatus of the character described having, in combination with a motion-picture camera having a motion-picture-camera shutter for taking motion-pictures of an object at times during the operation of the camera when the shutter is open, a still camera having a normally closed still-camera shutter, a plurality of flash-lamps, a plurality of electric circuits to which the respective flash-lamps are respectively connected, means for controlling one of the circuits to energize the flash-lamp connected thereto to produce a flash, means whereby the controlling means is effective to energize the flash-lamp connected to the said one circuit at a time only during the operation of the motion-picture camera when the motion-picture-camera shutter is closed, a normally ineffective amplifier, photosensitive means responsive to the light of the flash produced by the said one flash-lamp for rendering the amplifier effective, means connecting the amplifier with another circuit for controlling such other circuit to energize the flash-lamp connected thereto to produce a flash during the time of flash of the flash-lamp connected to the said one circuit, and means operable in response to the operation of the motion-picture camera when the motion-picture-camera shutter is closed and when the said flash-lamps are flashing for opening the still-camera shutter.

9. Apparatus of the character described having, in combination with a motion-picture camera having a shutter for taking motion-pictures of an object at times during the operation of the camera when the shutter is open, a flash-lamp, an electric circuit to which the flash-lamp is connected, means for controlling the circuit to energize the flash-lamp in order to illuminate the object, means whereby the controlling means is effective to energize the flash-lamp at a time only during the operation of the camera when the shutter is closed, and means operable in response to the operation of the camera when the shutter is closed and when the flash-lamp is flashing for taking a still picture of the object.

10. Apparatus of the character described having, in combination with a motion-picture camera having a shutter for taking motion-pictures of an object at times during the operation of the camera when the shutter is open, a flash-lamp, means for flashing the flash-lamp to illuminate the object, means whereby the flashing means is effective to flash the flash-lamp at a time only during the operation of the camera when the shutter is closed, and means operable in response to the operation of the camera when the shutter is closed and when the flash-lamp is flashing for taking a still picture of the object.

11. Apparatus of the character described having, in combination with a motion-picture camera having a shutter for taking motion-pictures of an object at times during the operation of the camera when the shutter is open, means normally ineffective during the operation of the camera and operative when effective to make an exposure of the object, means controlled manually for rendering the exposure-making means effective during the operation of the camera, and means whereby the manually-controlled means may render the exposure-making means effective at times only during the operation of the camera when the shutter is closed.

12. Apparatus of the character described having, in combination with a motion-picture camera having a shutter for taking motion-pictures of an object at times when the shutter is open, means normally ineffective during the operation of the camera and operative when effective to illuminate the object and make an exposure of the illuminated object, manually-controlled means for rendering the illuminating-and-exposure-making means effective during the operation of the camera, and means whereby the manually-controlled means may render the illuminating-and-exposure-making means effective at times only during the operation of the camera when the shutter is closed.

13. Apparatus of the character described having, in combination with a motion-picture camera having a shutter for taking motion-pictures of an object at times during the operation of the camera when the shutter is open, a flash-lamp, an electric circuit to which the flash-lamp is connected, means normally ineffective during the operation of the camera and operative when effective to control the circuit to energize the flash-lamp in order to illuminate the object and to make an exposure of the illuminated object during the operation of the camera, means for rendering the energizing-and-exposure-making means effective, and means whereby the rendering means may render the energizing-and-exposure-making means effective at times only during the operation of the camera when the shutter is closed.

14. Apparatus of the character described having, in combination with a motion-picture camera having a shutter for taking motion-pictures of an object at times during the operation of the camera when the shutter is open, a plurality of flash-lamps, means for flashing one of the flash-lamps to illuminate the object, means whereby the flashing means is effective to flash the said one flash-lamp at a time only during the operation of the camera when the shutter is closed, means responsive to the flash produced by the said one flash-lamp for flashing another flash-lamp, and means operable in response to the operation of the camera when the shutter is closed and when the flash-lamps are flashing for making an exposure of the object.

15. Apparatus of the character described having in combination with a motion-picture camera having a motion-picture-camera shutter for taking motion-pictures of an object at times during the operation of the camera when the shutter is open, a still camera having a normally closed still-camera shutter, means for opening the still-camera shutter, and means whereby the opening means is effective to open the still-camera shutter at times only during the operation of the motion-picture camera when the motion-picture-camera shutter is closed.

16. Apparatus of the character described having, in combination with a motion-picture camera having a motion-picture-camera shutter for taking motion-pictures of an object at times during the operation of the camera when the shutter is open, a still camera having a normally closed still-camera shutter, means for illuminating the object and opening the still-camera shutter, and means whereby the illuminating-and-opening means is effective to illuminate the object and open the still-camera shutter at times only during the operation of the motion-picture camera when the motion-picture-camera shutter is closed.

17. Apparatus of the character described having, in combination with a motion-picture camera having a shutter for taking motion pictures of an object at times during the operation of the camera when the shutter is open, normally ineffective means for taking a still picture of the object, means for rendering the still-picture-taking means effective, and means whereby the still-picture-taking means may be rendered effective at times only during the operation of the motion-picture camera when the shutter is closed.

18. Apparatus of the character described having, in combination with a motion-picture camera having a shutter for taking motion pictures of an object at times during the operation of the camera when the shutter is open, means for illuminating the object, means whereby the illuminating means is effective at times only during the operation of the camera when the shutter is closed, and means operable in response to the operation of the camera when the shutter is closed and while the object is illuminated for taking a still picture of the object.

19. Apparatus of the character described having, in combination with a motion-picture camera for making motion-picture exposures of an object, means for illuminating the object, means whereby the illuminating means is effective at times only during the operation of the camera when the object is not being exposed in the camera, and means operable in response to the operation of the camera during the said times and while the object is illuminated for taking a still picture of the object.

20. A method of taking still pictures of an object without interrupting the continuous operation of a motion-picture camera that is rapidly operated continuously to expose the object rapidly in the camera during briefly separated brief intervals of time, the method comprising, while the camera is rapidly operating continuously, illuminating the object during a brief interval of time between the said briefly separated brief intervals of time, and taking a still picture of the object during the said brief interval of time and while the object is illuminated.

21. A method of taking still pictures of an object without interrupting the continuous operation of a motion-picture camera having a shutter that is rapidly opened and closed continuously for successive brief intervals of time to expose the object rapidly in the camera during the briefly separated brief intervals of time when the shutter is open, the method comprising, while the shutter is rapidly opening and closing continuously, illuminating the object during a brief interval of time between the said briefly separated brief intervals of time, when the shutter is closed, and taking a still picture of the object during the said brief interval of time and while the object is illuminated.

22. Apparatus of the character described having, in combination with a motion-picture camera having a shutter for taking motion-pictures of an object at times during the operation of the camera when the shutter is open, means normally ineffective during the operation of the camera and operable when effective to illuminate the object, means controlled manually for rendering the illuminating means effective during the operation of the camera, and means whereby the manually controlled means may render the illuminating means effective to illuminate the object at times only during the operation of the camera when the shutter is closed.

23. Apparatus of the character described having, in combination with a motion-picture camera having a shutter for taking motion-pictures of an object at times during the operation of the camera when the shutter is open, a flash-lamp, manually controlled means for energizing the flash-lamp in order to illuminate the object, and means whereby the manually controlled means is effective to energize the flash-lamp at times only during the operation of the camera when the shutter is closed.

24. Apparatus of the character described having, in combination with a motion-picture camera having a shutter for taking motion pictures of an object at times during the operation of the camera when the shutter is open, means for illuminating the object, means whereby the illuminating means is effective at times only during the operation of the camera when the shutter is closed, and manually controlled means operable in response to the operation of the camera when the shutter is closed and while the object is illuminated for taking a still picture of the object.

25. Apparatus of the character described having, in combination with a motion-picture camera for making motion-picture exposures of an object, means for illuminating the object, means whereby the illuminating means is effective at times only during the operation of the camera when the object is not being exposed in the camera, and manually controlled means operable in response to the operation of the camera during the said times and while the object is illuminated for taking a still picture of the object.

HAROLD E. EDGERTON.